United States Patent [19]

Hu et al.

[11] Patent Number: 5,177,784
[45] Date of Patent: Jan. 5, 1993

[54] HEAD-SET TELEPHONE DEVICE AND METHOD

[76] Inventors: Robert Hu; Jonathan Hu, both of 1625 E. Westwind, Tempe, Ariz. 85283

[21] Appl. No.: 613,168

[22] Filed: Nov. 15, 1990

[51] Int. Cl.⁵ .................. H04M 1/00; H04R 25/00
[52] U.S. Cl. .................. 379/430; 379/433; 381/183; 381/187
[58] Field of Search .......... 379/430, 433, 434; 381/187, 183, 169

[56] References Cited

U.S. PATENT DOCUMENTS

| | | | |
|---|---|---|---|
| 4,484,029 | 11/1984 | Kenney | 379/430 |
| 4,754,484 | 6/1988 | Larkin et al. | 381/187 |
| 4,782,527 | 11/1988 | Williamson et al. | 379/430 |
| 4,821,318 | 4/1989 | Wu | 381/183 |
| 4,882,745 | 11/1989 | Silver | 381/183 |
| 4,907,266 | 3/1990 | Chen | 379/430 |
| 4,930,148 | 5/1990 | Lee | 379/430 |
| 5,003,589 | 3/1991 | Chen | 379/433 |

FOREIGN PATENT DOCUMENTS 1218086  1/1971  United Kingdom .............. 381/183

Primary Examiner—James L. Dwyer
Assistant Examiner—Jason Chan
Attorney, Agent, or Firm—Harry M. Weiss

[57] ABSTRACT

Several embodiment of a telephone device having a cradle and a headset assembly are disclosed. Each headset has spring biased members to firmly hold the headset on a person's head which device frees the hands when listening thereto or talking therein. In one embodiment, the headset has first and second resilient, spring-biased retractable bars having respective outer ends fixedly connected to respective first and second ear speakers. Other embodiments use bar shaped or square shaped elements to hold the speakers and mechanical arrangements to extend or retract the bar shaped or square shaped elements. The headset embodiments are disclosed for use with conventional telephone systems that have telephone lines or cords to cradles or for use with remote or cordless systems that can be used for cellular or non-cellular telephone systems.

7 Claims, 4 Drawing Sheets

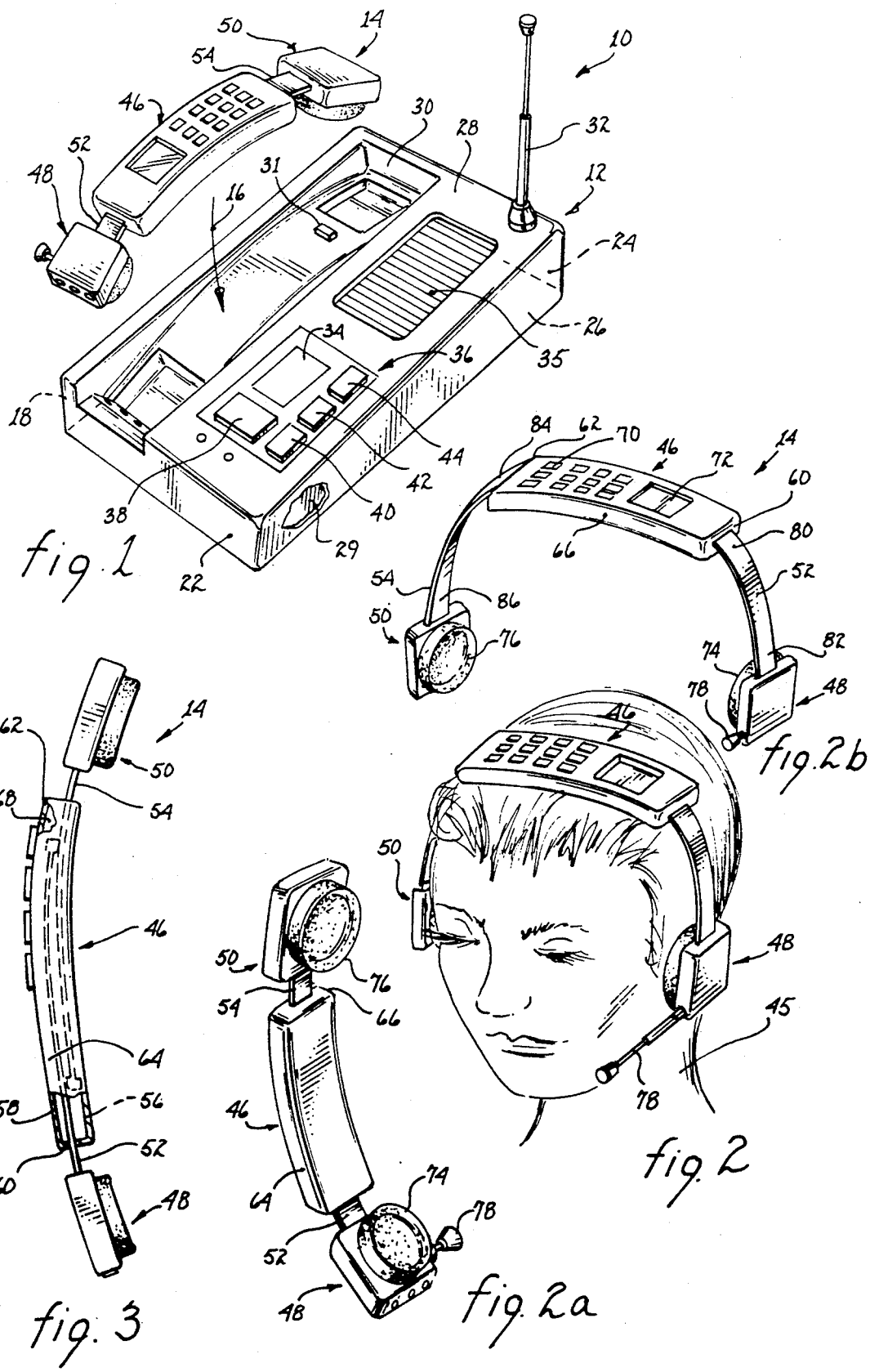

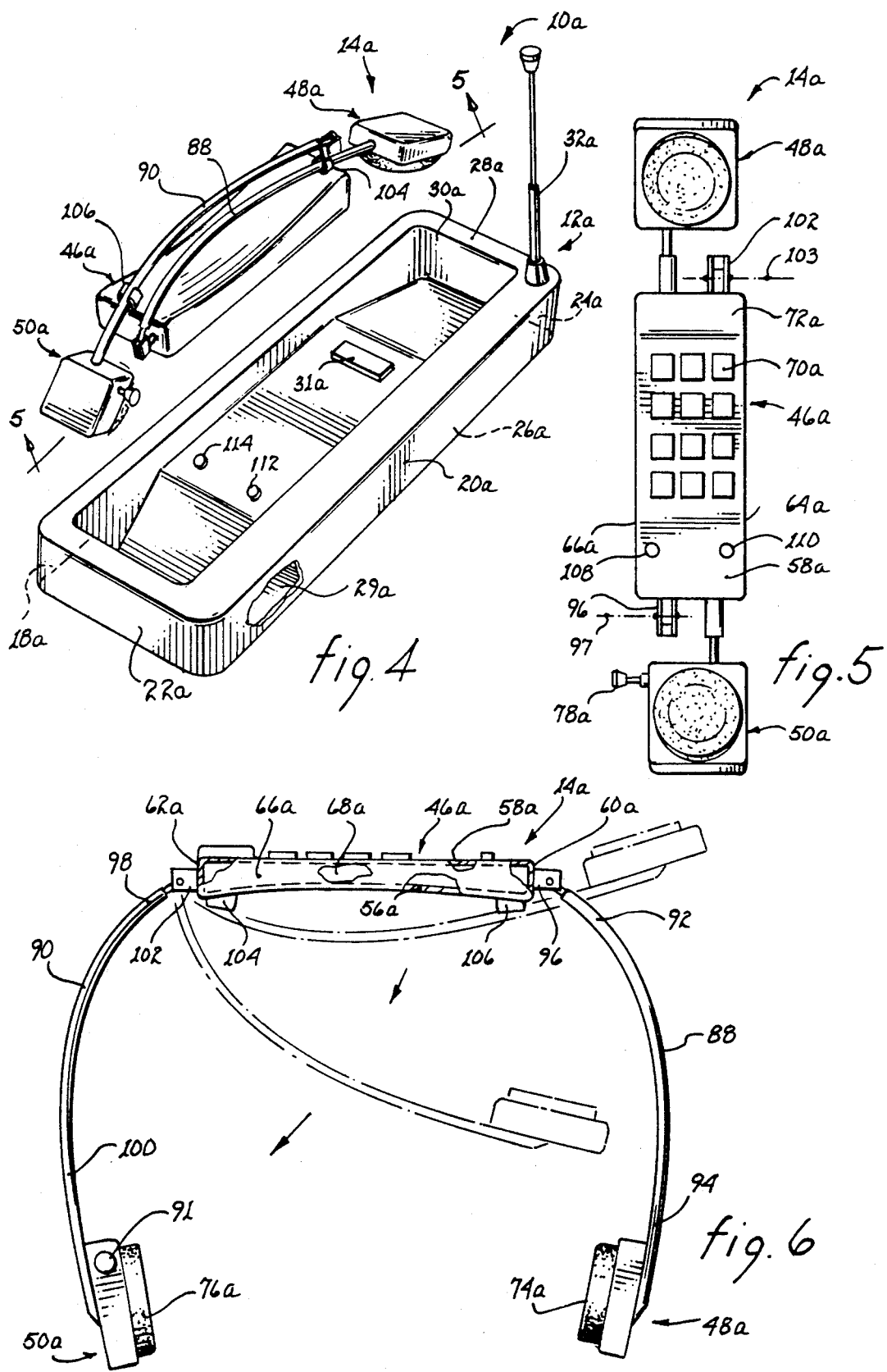

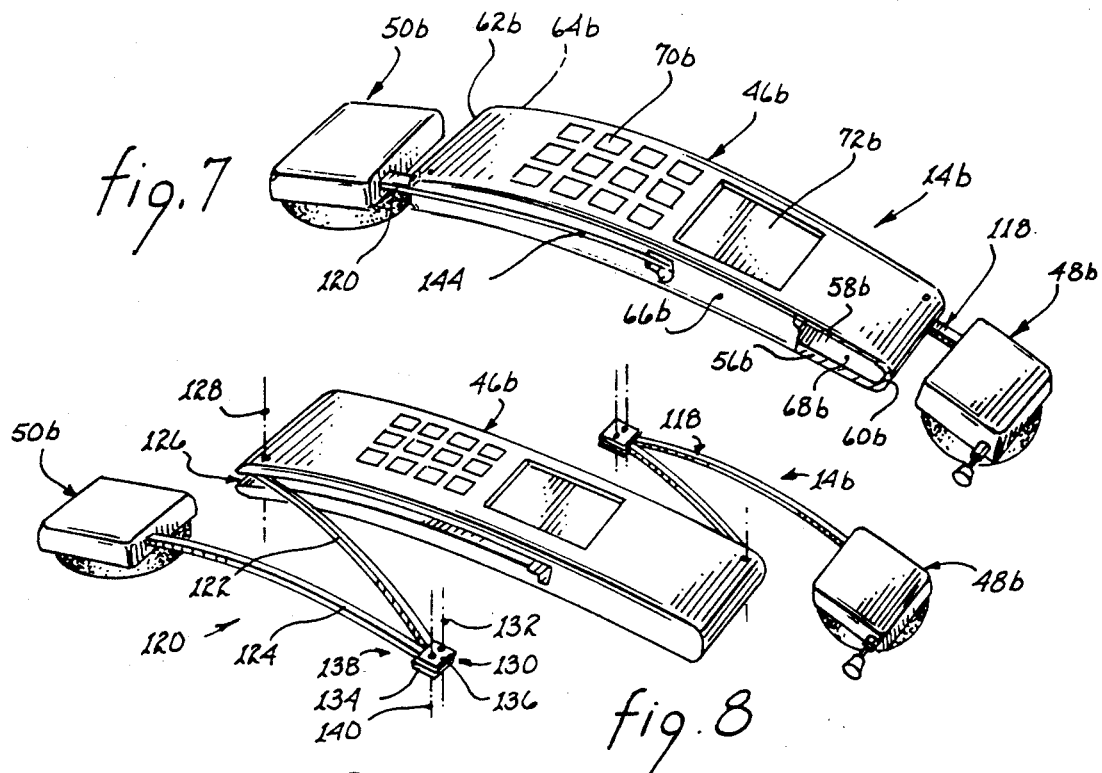
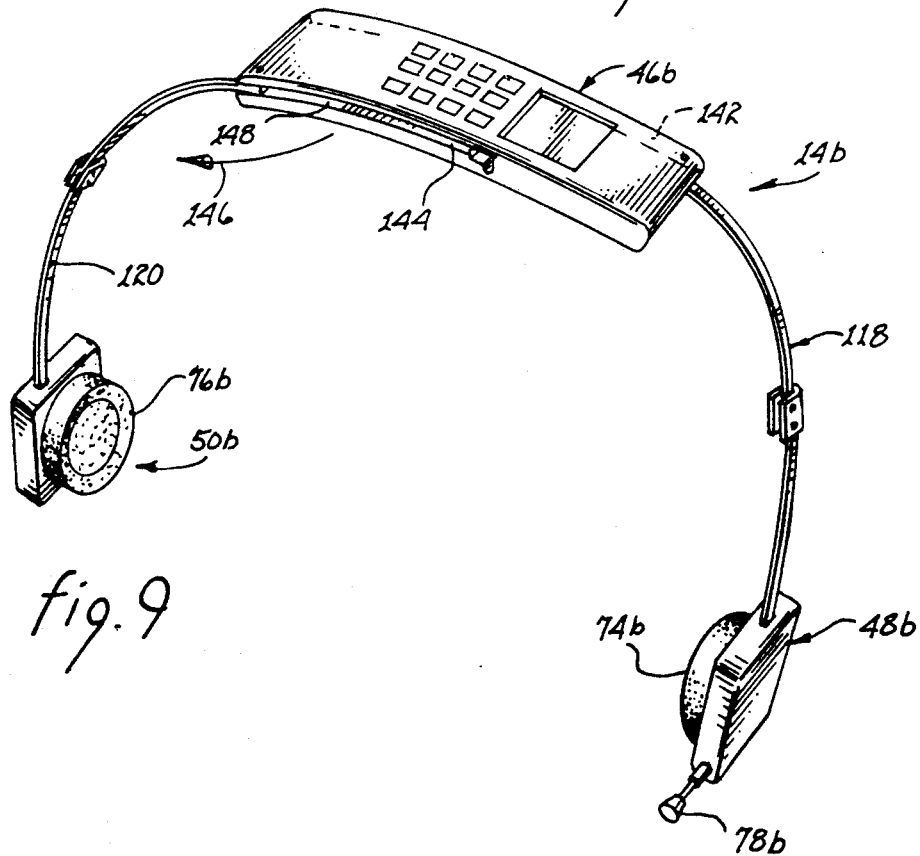

5,177,784

HEAD-SET TELEPHONE DEVICE AND METHOD

The invention generally relates to telephone devices and methods, and in particular, the invention relates to head set type telephone devices and methods therefor.

BACKGROUND OF THE INVENTION

In the past, various telephone devices were developed for the ease and use of the subscriber. Generally speaking, many of these various telephone devices were developed for use with electrical type telephone cords connected to a hand-held unit that a person used for both speaking and listening purposes. In recent times, remote type telephone devices were developed which did not use electrical type telephone cords connected to the hand-held unit. These remote type (cordless) telephone devices were developed for both conventional telephone systems and for cellular telephone systems.

One problem with these prior art telephone devices is that one hand of the user is fully occupied with holding the hand-held unit for speaking and listening purposes.

Accordingly, there was a need to provide head-set type telephone devices that were reliable and capable of use for either conventional or remote telephone systems.

SUMMARY OF THE INVENTION

Therefore, it is an object of this invention to provide improved head-set type telephone devices and methods therefor.

It is a further object of this invention to provide improved head-set type telephone devices and methods therefore which can be used with either remote (cordless) or cord type telephone systems.

It is still further object of this invention to provide improved head-set type telephone devices and methods therefor which have means associated therewith to insure more reliable gripping action on a person's head.

It is still another object of this invention to provide improved head-set type telephone devices and methods which have unique mechanical means associated therewith to facilitate both coupling to telephone cradles and provide better gripping action on a person's head.

According to the present invention, various telephone devices are provided. One telephone device comprises a cradle and a headset. The headset has a center housing with a chamber. This housing has first and second ear speakers and first and second retractable means with respective outer ends fixedly connected respectively to the first and second speakers and with respective inner ends slidable connected to the center housing for disposition in the chamber when retracted.

The foregoing and other objects, features and advantages will be apparent from the following description of the preferred embodiment of the invention as illustrated in the accompanying drawings.

BRIEF DESCRIPTION OF THE DRAWINGS

FIG. 1 is a perspective view of the headset telephone device according to the invention;

FIG. 2 is a perspective view of the headset telephone device of FIG. 1 fitted on the head of a user thereby showing the headset in an extended position;

FIG. 2a is another perspective view of the headset of FIG. 2 viewing the headset from the inside and in the retracted position shown in FIG. 1;

FIG. 2b is still another perspective view of the headset of FIG. 2 showing the headset in its extended position;

FIG. 3 is a side elevational view of the headset of FIG. 1 showing the headset in its retracted position;

FIG. 4 is a perspective view of a second embodiment of the headset telephone device according to the invention;

FIG. 5 is a view as taken along the line 5—5 of FIG. 4 showing the headset from an inside view;

FIG. 6 is a front view of the headset of FIG. 5 showing how its arms are extended;

FIG. 7 is a perspective view of a third embodiment of the headset telephone device according to the invention showing the top or outside portion;

FIG. 8 is a perspective view of the device of FIG. 7 with its arms partly extended;

FIG. 9 is a perspective view of the device of FIG. 7 with its arms fully extended;

DESCRIPTION OF THE PREFERRED EMBODIMENTS

Figure 10:
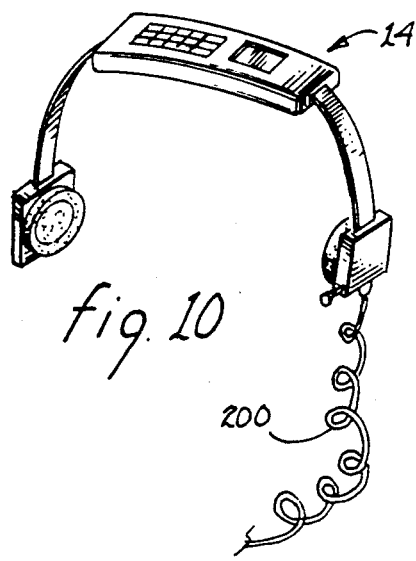
FIG. 10 is a perspective view of the telephone headset device of FIG. 1, but showing the device in its extended position with a telephone cord or line for connection to a cradle.

As shown in FIGS. 1, 2 and 3, a first embodiment of a telephone device 10 in accordance with this invention is provided. Device 10 includes a cradle 12, and a headset 14 which is moved in a direction 16 for resting on cradle 12. The headset 14 is a remote or cordless type headset for use by a subscriber away from the cradle 12. The headset 14 is shown in its retracted position in FIG. 1. Wiring to the cradle 12 and the electronic components for the headset 14 and the cradle 12 are not shown because they are known.

As shown in FIG. 1, cradle 12 has left and right side walls 18, 20 and has front and back end walls 22, 24 and has lower and upper walls 26, 28, which together enclose a cavity 29 for housing electronic components (not shown). Upper wall 28 has a recess 30, and has an on-off switch button 31 for use with the headset 14. Upper wall 28 also has a cradle antenna 32, a microphone 34, a speaker 35, and a control panel 36. Panel 36 has control buttons 38, 40, 42, 44. In many remote or cordless telephone system embodiments the cradle 12 may not need to have the features or elements 34, 35, 36, 38, 40, 42 and 44.

As shown in FIGS. 1, 2, 2a, 2b and 3, headset 14 is a remote or cordless type of headset which can be used in a home or office or for cellular type applications or systems. Headset 14 is placed on the head of its operator or user or person 45 (see FIG. 2). Headset 14 has a center housing 46 (see FIGS. 2b, 2, 2a and 31, a first ear housing or speaker 48, and a second ear speaker 50. Headset 14 also has a first retractable and extendable spring-biased arm, or bar, or strip 52 and has a second retractable and extendable spring-biased strip 54.

Housing 46, which has an arcuate shape, has arcuate-shaped lower and upper walls or plates 56, 58 (see FIG. 3). Housing 46 also has first and second end plates 60, 62, and has first and second side plates 64, 66 (see FIG. 2a) which together enclose a chamber 68 (see FIG. 3) for placement therein of electronic components (not shown). Upper plate 58 has a plurality of buttons 70 (see FIG. 2b) which are punch type buttons, and has a microphone 72.

Speakers 48, 50 have respective cushions 74, 76. Speaker 48 has a headset antenna 78 which is extended (see FIG. 2) when the headset is used away from the cradle 12.

Strips 52, 54, which are both extendable and retractable, are resilient, spring-biased strips to provide a positive gripping action on the head of any person regardless of the size of the person's head. Strip 52 has an inner end 80 (see FIG. 2b), which is slidable through an opening in plate 60. Strip 52 has an outer end 82, which is fixedly connected to speaker 48. Strip 54 also has an inner end 84, which is slidable through an opening in plate 62. Strip 54 also has an outer end 86, which is fixedly connected to speaker 50.

Strips 52, 54 are normally somewhat arcuate in shape as shown in FIG. 2. Strips 52, 54 are flexed to a substantially flatter shape, when retracted and when disposed in chamber 68 as shown in FIG. 3. Strips 52, 54 normally exert respective inward directed force on the head of user 45, as strips 52, 54 are spring biased for this purpose. This provides a positive gripping action and prevents the headset from coming off a person's head when in use thereby enabling hand-free operation. Electrical contacts at the bottom of speaker 48 (three are shown) electrically contact the electrical contacts on the cradle 12 (see FIG. 1) to permit charging of the headset 14 by the cradle 12 when the headset 14 is placed on the cradle 12.

As shown in FIGS. 4, 5 and 6, a second embodiment telephone device 10a is provided. Parts of embodiment 10a, which are the same as corresponding parts of embodiment 10, have the same numerals, but with a subscript "a" added thereto. Device 10a includes a cradle 12a and a headset 14a.

Cradle 12a has left and right side walls 18a, 20a, and has front and back end walls 22a, 24a, and has lower and upper walls 26a, 28a, which enclose a cavity 29a. Upper wall 28a has a recess 30a and has an on-off switch button 31a. Upper wall 28a also has a cradle antenna 32a.

As shown in FIGS. 4, 5, and 6, headset 14a has a center housing 46a, a speaker 48a, and a second speaker 50a. Headset 14a also has a first spring-biased bar 88 of preferably round cross-section, and has a second spring-biased bar 90 of preferably round cross-section.

Housing 46a has lower and upper plates 56a, 58a (see FIG. 6), and has first and second end plates 60a, 62a (see FIG. 5) and has first and second side plates 64a, 66a (see FIG. 5) which enclose a chamber 68a. Plate 58a has a plurality of buttons 70a, and has a microphone 72a (see FIG. 5).

Speakers 48a, 50a have respective cushions 74a, 76a (see FIG. 6). Speaker 50a has a retractable-extendable headset antenna 91.

Bar 88 has an inner end 92, and has an outer end 94. Inner end 92 has a pivot means 96 with axis 97 (see FIG. 5). Pivot 96 is fixedly connected to plate 60a (see FIG. 6). Bar 90 has an inner end 98, and has an outer end 100.

Inner end 98 has a pivot means 102 with its axis 103 (see FIG. 5). Axis 97 and 103 are horizontal axes. Plate 56a has a first clip 104 (see FIGS. 4 and 6) for holding bar 88 when retracted. Plate 56a also has a second clip 106 for holding bar 90 when retracted. Plate 58a of headset 14a has electrical contacts 108, 110 which permit charging of the headset 14a is placed on the cradle 12a to permit the electrical contacts 108, 110 to be contacted by electrical contacts 112, 114 (see FIG. 4) of the cradle 12a.

As shown in FIGS. 7, 8, and 9, a third embodiment or telephone device 10b is provided. Parts of embodiment 10b, which are the same as corresponding parts of embodiment 10, have the same numerals, but with a subscript "b" added thereto. Device 10b has a cradle (not shown) and a headset 14b.

Headset 14b in FIG. 7 is fully retracted or folded inward. Headset 14b in FIG. 8 is partly extended or opened. Headset 14b in FIG. 9 is fully extended. Headset 14b has a housing 46b, a first speaker 48b, and a second speaker 50b. Headset 14b also has a first bar unit 118 (see FIG. 8) of preferably square cross-section, and has a second bar unit 120 of preferably square cross-section.

Housing 46b has lower and upper plates 56b, 58b (see FIG. 7) and has end plates 60b, 62b, and has side plates 64b, 66b, which enclose a chamber 68b. The side plates 64b, 66b are longer than the end plates 60b, 62b. Upper plate 58b has a plurality of buttons 70b, and has a microphone 72b (see FIG. 9). Speakers 48b, 50b, have respective cushions 74b, 76b (See FIG. 9).

As shown in FIG. 8, bar unit 118 is identical to bar unit 120. Bar unit 120 has an inner bar 122 and an outer bar 124. Inner bar 122 has a first pivot 126 with a vertical axis 128 at its inner end. Inner bar 122 also has a second pivot 130 with a vertical axis 132 at its outer end. Inner bar 122 also has lower and upper gusset or pivot plates 134, 136 at its outer end. Outer bar 124 has a third pivot 138 with a vertical axis 140 at its inner end. Outer bar 124 is fixedly connected to speaker 50b at its outer end.

As shown in FIGS. 7 and 9, side plates 64b, 66b have respective elongated recesses 142, 144, which receive respective bar units 118, 120. Recess 144, which is identical to recess 142, has a wedge pin 146 (see FIG. 9) or the like, which is received in a groove 148 within recess 144, in order to provide frictional engagement with inner bar 122 for latching or holding bar unit 120 within recess 144. In FIG. 7, bar units 118, 120 are shown in an unflexed, retracted, substantially flat configuration in respective recesses 142, 144. In FIG. 9, for units 118, 120 as shown in their extended biased position to permit the headset 14b to be mounted on a person's head.

Figure 11A:
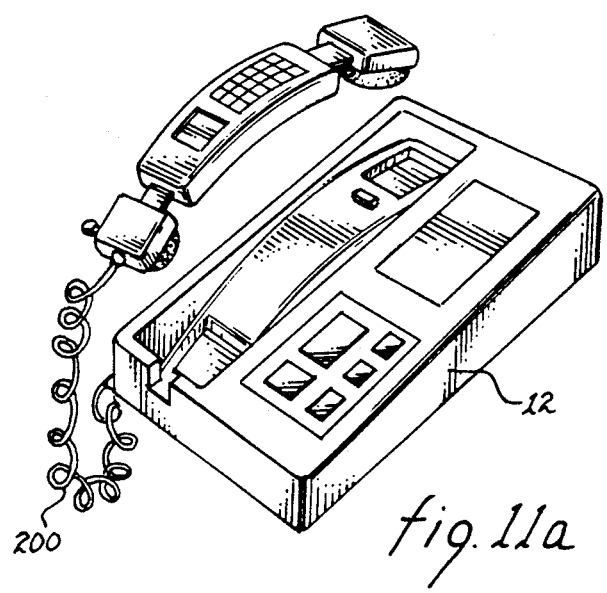
FIG. 11a is a perspective view similar to the perspective view of FIG. 1 showing the telephone headset device of FIG. 10 in its retracted position and connected to its associated cradle.

FIGS. 10 and 11a depict the headset 14 of the type shown in FIGS. 1, 2, 2a and 3, but with a telephone cord or line 200 connected to the headset 14 to enable the headset 14 to be connected to a cradle 12 thereby depicting the use of the headset 14 in a conventional wired (not a remote or cordless) connection to the cradle 12.

Figure 11:
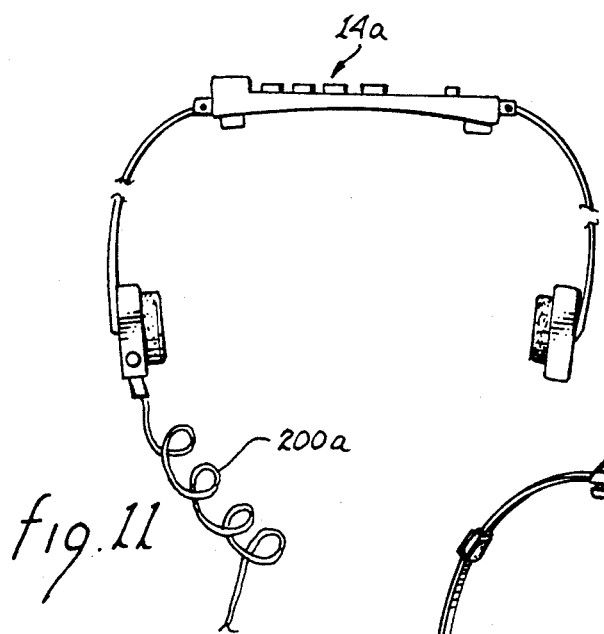
FIG. 11 is a side elevational view of the telephone headset device of FIG. 4 showing the device in its extended position with a telephone cord or line for connection to a cradle.

FIG. 11 depicts the headset 14a of the type shown in FIGS. 4, 5 and 6 similarly (like the headset 14 of FIGS. 10 and 11a) connected to a cradle (now shown) by wire or cord 200a.

Figure 12:
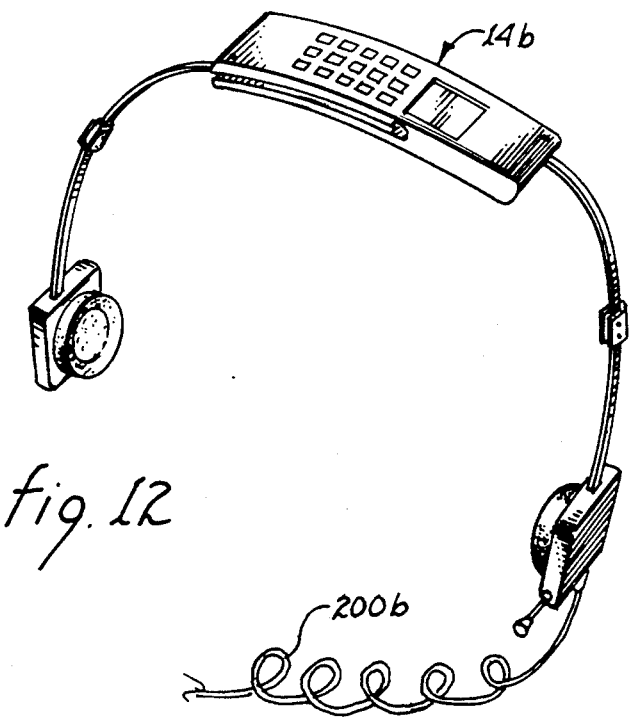
FIG. 12 is a perspective view of the telephone headset of FIG. 7 showing the device in its extended position with a telephone cord or line for connection to a cradle.

FIG. 12 depicts the headset 14b of the type shown in FIGS. 7, 8, and 9 similarly (like the headset 14 of FIGS. 10 and 11a) connected to a cradle (not shown) by wire or cord 200b.

While the invention has been described in its preferred embodiment, it is to be understood that the words which have been used are words of description rather than limitation and that changes may be made within the purview of the appended claims without departing from the true scope and spirit of the invention in its broader aspects. For example, strips 52, 54 of the embodiment of FIG. 1, round bars 88, 90 of the embodiment of FIG. 4 and square bars 118, 120 of the embodiment of FIG. 7 can be made hollow, so that wires to the speakers can be enclosed within the strips and bars, as desired. It should also be understood that the headset 14 of FIGS. 1 and 10, the headset 14a of FIGS. 4 and 11, and the headset 14b of FIGS. 7 and 12 can be used, because of the retractability features of the arms thereof, as a conventional hand-held telephone headset, if desired. Furthermore, the element 78 of FIGS. 2, 2b, the element 78a of FIG. 5 and the element 78b of FIG. 9, which is described as being an antenna, could, if desired, be made to be a microphone to permit the user to speak into the microphone 78, 78a, 78b.

The embodiments of an invention in which an exclusive property or right is claimed are defined as follows:

1. A telephone device comprising:
   a cradle;
   a headset for use with said cradle and having a center housing, said center housing having first and second end walls and first and second side walls, said first and second side walls are longer than said first and second end walls; and
   means coupled to said center housing of said headset for providing resilient, spring-biased, retractable members to firmly attach said headset to a person's head;
   said means comprising a pair of resilient, spring-biased retractable members, and a pair of speakers connected to said pair of members, each of said pair of members is connected at one end thereof to its respective speaker and movably coupled at the other end thereof to said center housing;
   each of said pair of members comprising a bar shaped element having a square shaped cross-section; and
   recess latching means located on said center housing including first and second recessed disposed respectively in said first and second side walls of said center housing for permitting each said bar shaped element to be held on said recess latching means of said center housing.

2. The device of claim 1 wherein each said bar shaped element comprising two-piece bars each having an inner bar piece and pivot means therebetween for pivoting an outer bar piece relative to the inner bar piece.

3. The device of claim 1 wherein said headset having a telephone cord connected thereto for connection to said cradle.

4. A method of providing a telephone device comprising the steps of:
   providing a cradle;
   providing a headset for use with said cradle and having a center housing, said center housing having first and second end walls and first and second side walls, said first and second side walls are longer than said first and second end walls; and
   providing means coupled to said center housing of said headset for providing resilient, spring-biased, retractable members to firmly attach said headset to a person's head;
   said means comprising a pair of resilient, spring-biased retractable members, and a pair of speakers connected to said pair of members, each of said pair of members is connected at one end thereof to its respective speaker and movably coupled at the other end thereof to said center housing;
   each of said pair of members comprising a bar shaped element having a substantially uniform shaped cross-section; and
   recess latching means located on said center housing including first and second recesses disposed respectively in said first and second side walls of said center housing for permitting each said bar shaped element to be held on said recess latching means of said center housing.

5. The method of claim 4 wherein each said bar shaped element having a square shaped cross-section.

6. A telephone device comprising:
   a cradle;
   a headset for use with said cradle and having a center housing; and
   means coupled to said center housing of said headset for providing resilient, spring-biased, retractable members to firmly attach said headset to a person's head;
   said means comprising a pair of resilient, spring-biased retractable members, and a pair of speakers connected to said pair of members, each of said pair of members is connected at one end thereof to its respective speaker and movably coupled at the other end thereof to said center housing;
   each of said pair of members comprising a bar shaped element having a substantially uniform cross-section, an outer end of each bar shaped element fixedly connected to its respective speaker and an inner end of each bar shaped element coupled to pivot means for permitting swingable connection to said center housing of said headset;
   said pivot means are mounted on the center housing;
   said center housing having latching means for latching each said bar shaped element when fully retracted.

7. The device of claim 6, wherein each said bar shaped element having a round cross-section; said latching means includes first and second clip members mounted on said center housing.

* * * * *